United States Patent [19]

Mailloux

[11] Patent Number: 5,466,324

[45] Date of Patent: Nov. 14, 1995

[54] APPARATUS AND PROCESS FOR SEPARATION OF LAMINAE

[75] Inventor: Dennis R. Mailloux, Westminster, Mass.

[73] Assignee: Polaroid Corporation, Cambridge, Mass.

[21] Appl. No.: 158,644

[22] Filed: Nov. 29, 1993

[51] Int. Cl.⁶ .................................................. B32B 35/00
[52] U.S. Cl. ........................ 156/344; 156/584; 283/109; 271/18; 271/280; 83/27; 83/105; 83/407; 83/433; 83/435.2; 83/874
[58] Field of Search .................... 156/344, 584; 283/109; 83/27, 49, 86, 105, 407, 433, 435.2, 870, 874, 412; 271/18, 280

[56] References Cited

U.S. PATENT DOCUMENTS

| | | | |
|---|---|---|---|
| 3,000,630 | 9/1961 | Slate | 271/285 |
| 3,028,742 | 4/1962 | Hacker et al. | 83/874 X |
| 3,169,427 | 2/1965 | Cave | 83/870 |
| 3,313,052 | 4/1967 | Malster | 40/2.2 |
| 3,477,896 | 11/1969 | Townsend et al. | 156/584 |
| 3,479,912 | 11/1969 | Kennedy | 83/912 |
| 3,601,389 | 8/1971 | Kramer | 271/18 |
| 3,647,442 | 3/1972 | Malster | 96/29 |
| 3,981,495 | 9/1976 | Bijttebier | 271/18.3 |
| 4,101,701 | 7/1978 | Gordon | 428/189 |
| 4,305,215 | 12/1981 | Smith | 40/1.5 |
| 4,322,461 | 3/1982 | Raphael et al. | 428/14 |
| 4,892,335 | 1/1990 | Taft | 283/75 |
| 5,052,875 | 10/1991 | Miller et al. | 83/912 X |
| 5,066,047 | 11/1991 | Mailloux et al. | 283/86 |
| 5,328,547 | 7/1994 | Boldrini et al. | 156/584 |

FOREIGN PATENT DOCUMENTS

| | | |
|---|---|---|
| 448975 | 10/1991 | European Pat. Off. . |
| 552047 | 7/1993 | European Pat. Off. . |
| 1351380 | 2/1964 | France . |
| 295098 | 2/1954 | Switzerland . |
| 1436660 | 5/1976 | United Kingdom ............. 83/912 |
| WO87/06197 | 10/1987 | WIPO . |

*Primary Examiner*—Mark A. Osele
*Attorney, Agent, or Firm*—David J. Cole

[57] ABSTRACT

An apparatus for separating a first flexible lamina of predetermined thickness from a second lamina to which the first lamina is adhered along an edge (e.g., a pouch for use in an identification card) includes a channel having a thickness not substantially greater than the combined thickness of the laminae, an impeller for impelling the laminae together through the channel and out of the outlet end, a cutter adjacent the outlet of the channel positioned to contact the edge at which the two laminae are adhered adjacent the line of adhesion between the laminae, thus separating the laminae, and a wedge adjacent the cutter so that as the first and second laminae are separated by the cutter and impelled past the wedge, the two laminae pass on opposed sides of the wedge, thereby increasing the separation between the laminae.

15 Claims, 3 Drawing Sheets

APPARATUS AND PROCESS FOR SEPARATION OF LAMINAE

BACKGROUND OF THE INVENTION

This invention relates to an apparatus and process for separation of laminae. This apparatus and process are especially but not exclusively intended for use in the manufacture of pouches used as parts of identification devices.

Laminar structures in the form of identification devices (for example, cards or badges) which carry a photograph and/or other identifying indicia pertaining to the bearer of the device are commonplace and have many recognized security and identification applications. Such identification devices are disclosed, for example, in U.S. Pat. Nos. 2,361,670; 3,313,052; and 4,305,215.

Such identification devices are often produced by laminating an insert comprising the photograph or other identifying indicia of the person authorized to use the card within a pouch comprising two sheets of plastic or similar material. For example, U.S. Pat. No. 4,322,461 describes an identity card structure and a method for the preparation thereof using a transferred adhesive. The laminar structures comprise a color diffusion transfer photographic print bonded to a vinyl sheet using an adhesive mixture of a vinyl acetate-ethylene copolymer and a hydroxylated polymer, and are prepared using an adhesive-supporting carrier sheet. Typically, the pouch carries heat-activatable adhesive which is activated to adhere the pouch to the insert and also to seal peripheral portions of the two plastic sheets which extend beyond the insert to one another so as to completely enclose the insert within the pouch. Such identification devices may hereinafter be called "insert/pouch" devices.

U.S. Pat. No. 4,101,701 describes an identity or credit card and a laminar assembly for preparing same. A layer comprising specific ethylene copolymers or mixtures thereof and a layer comprising a hydroxylated polymer is stated to be an especially effective heat-activatable adhesive in such cards.

U.S. Pat. No. 3,647,442 describes a laminar structure comprising a diffusion transfer color photographic image on a stratum comprising a mixture of polyvinyl pyridine and polyvinyl alcohol, the surface of the stratum being bonded to the surface of a transparent layer of sheet material, and an identification card including such a laminar structure.

In identification devices, ensuring that unauthorized persons cannot prepare forged devices sufficiently similar to authorized devices to deceive users and security personnel is of course of paramount importance, and great efforts have been made to render identification devices forgery-proof. One common means for improving the security of identification devices is the incorporation into the device of a hologram; holograms are extremely difficult to reproduce, and forged copies can readily be detected even by untrained personnel. See, for example, U.S. Pat. No. 5,066,047. In insert/pouch devices, it is common practice to attach the hologram to the pouch so that it becomes firmly bonded to the insert when the pouch is secured to the insert.

Commercial systems for issuing identification devices are of two main types, namely "on-the-spot" or "multipoint" issue, and "central" or "single-point" issue. In the former type, the intended bearer of an identification device will report to an issuance station where appropriate photographic materials and equipment are assembled. Typically, a data card containing personalized information relating to the bearer is prepared, usually by adding such information to a preprinted data card bearing information pertaining to the card issuing authority or association. The data card and the bearer are photographed simultaneously with a camera unit employing diffusion transfer photographic film, and the resultant print is used as an insert, which is placed within and heat-sealed to a pouch to form the identification device, which is then immediately handed to its bearer. Such a system minimizes the time required of the bearer and the technician operating the equipment, and provides the maximum security since both the bearer and the technician can check that the device has been properly prepared. In central issue systems, the bearer reports to a data gathering station where identifying data, normally including a photograph of the bearer, are prepared. However, in a central issue system, the identifying data are transmitted, as hard copy or electronically, to a central issue point where the final identification device is assembled and mailed to its bearer.

Central issue systems suffer from two serious drawbacks. Transmission of the data to the central station and mailing of the identification device back to the bearer typically takes several days, during which time the bearer is deprived of the device. If the bearer must have a device immediately (for example, because the device is a driver's license which the bearer is required by law to carry when driving), it is necessary for each data gathering station to be able to issue each bearer with a temporary identification device which can be used until the permanent device reaches the bearer. To reduce the cost of the temporary device and the apparatus needed at each data gathering station to produce it, the temporary device usually lacks at least some of the security features of the permanent device. The presence of even a small proportion of such low-security temporary devices circulating with the high-security permanent devices compromises the security provided by the entire system, since security personnel must accept the low-security temporary devices in place of the permanent ones, and the would-be counterfeiter's task is reduced to forging a low-security temporary device. This problem is exacerbated in practice by the tendency for identification devices to be used for purposes beyond those originally intended; for example, driving licenses are often used as age-checking devices to enforce alcoholic beverage control laws, so temporary driving licenses facilitate the purchase of alcohol by underage persons. Central issue systems also suffer from the disadvantage that the persons producing the final license never see the bearer, so any errors introduced in the data gathering process will not become apparent until the bearer receives the final identification device. Correcting the data takes additional time and effort on the part of the bearer, and in some cases (as for example where an employee is inadvertently assigned a security classification higher than that to which he is entitled, or a young driver is assigned an erroneous birthdate), the bearer may have an incentive not to correct the mistake.

For the foregoing reasons, both issuers and bearers of identification devices usually prefer a multipoint issue system to a central issue one. However, there is one disadvantage of multipoint issue systems to which central issue ones are not subject and which causes a minority of issuers to prefer central issue systems. In a multipoint system, it is necessary to distribute large quantities of the materials needed to produce the identification documents to all the points at which the devices are issued. For example, in a typical insert/pouch system in which an important security feature is a hologram supplied attached to the pouch, large numbers of pouches must be distributed to the numerous issue points. At present, such hologram-bearing pouches are not distinguishable from one another, and consequently an unauthorized person coming into possession of such a pouch can produce a forged identification device by forging an appropriate insert, which is usually much easier than forging a pouch. A large number of persons come into contact with the pouches during their distribution, including for example delivery personnel employed to transport the pouches to the issue points, and such persons may be strongly tempted to divert pouches to unauthorized persons given the willingness of many people, such as persons banned from driving and would-be underage drinkers, to pay substantial sums for forged identification devices. Indeed, there has been at least one case reported where an armed robbery was carried out at a Motor Vehicle Registry branch and the robber ignored cash but stole pouches, which are said to be worth more than $100 each on the black market.

The security of multipoint issue systems can be improved by uniquely identifying each element of an identification device which contains a security feature. For example, in the insert/pouch systems discussed above in which the main security feature is a hologram on the pouch, the security of the system could be improved by imprinting each pouch with a unique identifying indicium, e.g., a serial number. With each pouch uniquely identified, if any pouches are diverted to unauthorized users before use, the relevant serial numbers can be "voided" in an automated database, and persons charged with enforcing the security system can be instructed to check the database before accepting the validity of any purported security device. However, in practice there has been no satisfactory technique for applying the serial numbers or other indicia to the large numbers of pouches required in commercial practice. It is not satisfactory to place the serial number on the outside surface of the pouch, and thus on the outside surface of the finished identification device, since such serial numbers are subject to tampering. However, providing a serial number on an inside surface of the pouch requires opening the pouch (i.e., pulling its two leaves apart) and this process is surprisingly difficult to automate. Pouches are normally mass produced by superposing first and second sheets of material, each sheet having heat-activatable adhesive on one surface, and the adhesive-bearing surfaces being in contact. The sheets are then secured together at a number of positions, typically by spot welding, and then die cutting is effected through both sheets simultaneously so as to divide the sheets into a plurality of rectangular pouches each comprising a portion of the first sheet and a portion of the second sheet, the two portions (or "leaves") being secured together along one edge by one or more spot welds. The die cutting, together with the presence of the adhesive on the inner surfaces of the pouches causes the two leaves of each pouch to adhere to each other at least along their edges. Although it is possible to separate the leaves of each pouch manually, typically by twisting the pouch, it is very difficult to effect such separation mechanically, as is required for mass production of pouches bearing printing on at least one inner surface.

Accordingly, there is a need for an apparatus and process for separating the adhering leaves of pouches, and this invention provides such an apparatus and process. The apparatus and process of this invention may also be used in other areas where it is necessary to separate laminae.

SUMMARY OF THE INVENTION

Accordingly, this invention provides apparatus for separating a first flexible lamina of predetermined thickness from a second lamina to which the first lamina is adhered along an edge, this apparatus comprising:

a channel member having walls defining a channel having a thickness not substantially greater than the combined thickness of the first and second laminae, the channel having an outlet opening at one end;

impeller means for impelling the adhered first and second laminae together through the channel and out of the outlet opening;

cutter means disposed adjacent the outlet opening such that, as the adhered laminae are impelled through the outlet opening the cutter means contacts the edge at which the two laminae are adhered adjacent the line of adhesion between the laminae, thereby separating the laminae; and wedge means disposed adjacent the cutter means on the opposed side thereof from the outlet opening, the cross-section of the wedge means increasing with distance from the cutter means, the wedge means being arranged so that as the first and second laminae are separated by the cutter means and are impelled past the wedge means, the two laminae pass on opposed sides of the wedge means, thereby increasing the separation between the laminae.

This invention also provides a process for separating a first, flexible lamina of predetermined thickness from a second lamina to which the first lamina is adhered along an edge, this process comprising:

providing a channel member having walls defining a channel having a thickness not substantially greater than the combined thickness of the first and second laminae, the channel having an outlet opening at one end;

providing cutter means adjacent the outlet opening; and providing wedge means disposed adjacent the cutter means on the opposed side thereof from the outlet opening, the cross-section of the wedge means increasing with distance from the cutter means; and impelling the adhered first and second laminae together through the channel, through the outlet opening past the cutter means and over the wedge means, the cutter means contacting the edge at which the two laminae are adhered adjacent to line of adhesion between the laminae, thereby separating the laminae and causing the separated laminae to pass on opposed sides of the wedge means, thereby causing the separation between the laminae to increase as they pass the wedge means.

This invention also provides a process for preparing a series of pouches capable of being used as the outer layers of identification devices, this process comprising:

providing a first sheet of material, at least part of this first sheet being substantially transparent;

superposing a second sheet of material on the first sheet of material;

securing the first and second sheets together at at least one point;

severing the first and second sheets along a periphery to form at least one pouch blank, this pouch blank comprising a portion of the first sheet, at least part of this portion being transparent, a portion of the second sheet of substantially the same size and shape as the portion of the first sheet, and at least one point at which the first and second sheets are joined together, this point lying adjacent a first edge of the pouch blank, the portions of the first and second sheets in the pouch blank adhering to each other along at least a second edge of the blank;

providing a channel member having walls defining a channel having a thickness not substantially greater than the thickness of the pouch blank, the channel having an outlet opening at one end;

providing cutter means adjacent the outlet opening; and providing wedge means disposed adjacent the cutter means on the opposed side thereof from the outlet opening, the cross-section of the wedge means increasing with distance from the cutter means;

impelling the pouch blanks in succession through the channel, through the outlet opening, past the cutter means and over the wedge means, the cutter means contacting the second edge of the pouch blank adjacent to line of adhesion between the portions of the first and second sheets thereof, thereby separating the portions of the first and seconds sheet from each other and causing the separated portions to pass on opposed sides of the wedge means, thereby causing the separation between the separated portions to increase as they pass the wedge means;

after each pouch blank has passed the wedge means, contacting the edge of the portion of the first sheet remote from the first edge thereof with a first guide means, while the edge of the portion of the second sheet remote from the secured edge thereof contacts a second guide means, the first and second guide means holding the first and second laminae at an angle of at least about 30° to each other; and while the portions of the first and second sheets are in contact with the first and second guide means respectively, printing, on at least one of the faces of the portions of the first and second sheets which were in contact prior to the severing of the first and second sheets, an identifying indicium, a different indicium being printed on each of the pouch blanks.

Finally, this invention provides a set comprising a plurality of pouches, each of the pouches comprising first and second leaves secured together along one of their edges, each of the first and second leaves having an inner surface facing the opposed leaf and bearing an adhesive, each of the pouches bearing, on the inner surface of at least one leaf, a printed identifying indicium different from the indicium on all of the other pouches of the set.

DETAILED DESCRIPTION OF THE INVENTION

A preferred apparatus and process of the present invention will first be described, though by way of illustration only, with reference to the accompanying drawings, and thereafter there will be described certain variations and modifications contemplated within the scope of this invention.

Figure 1:
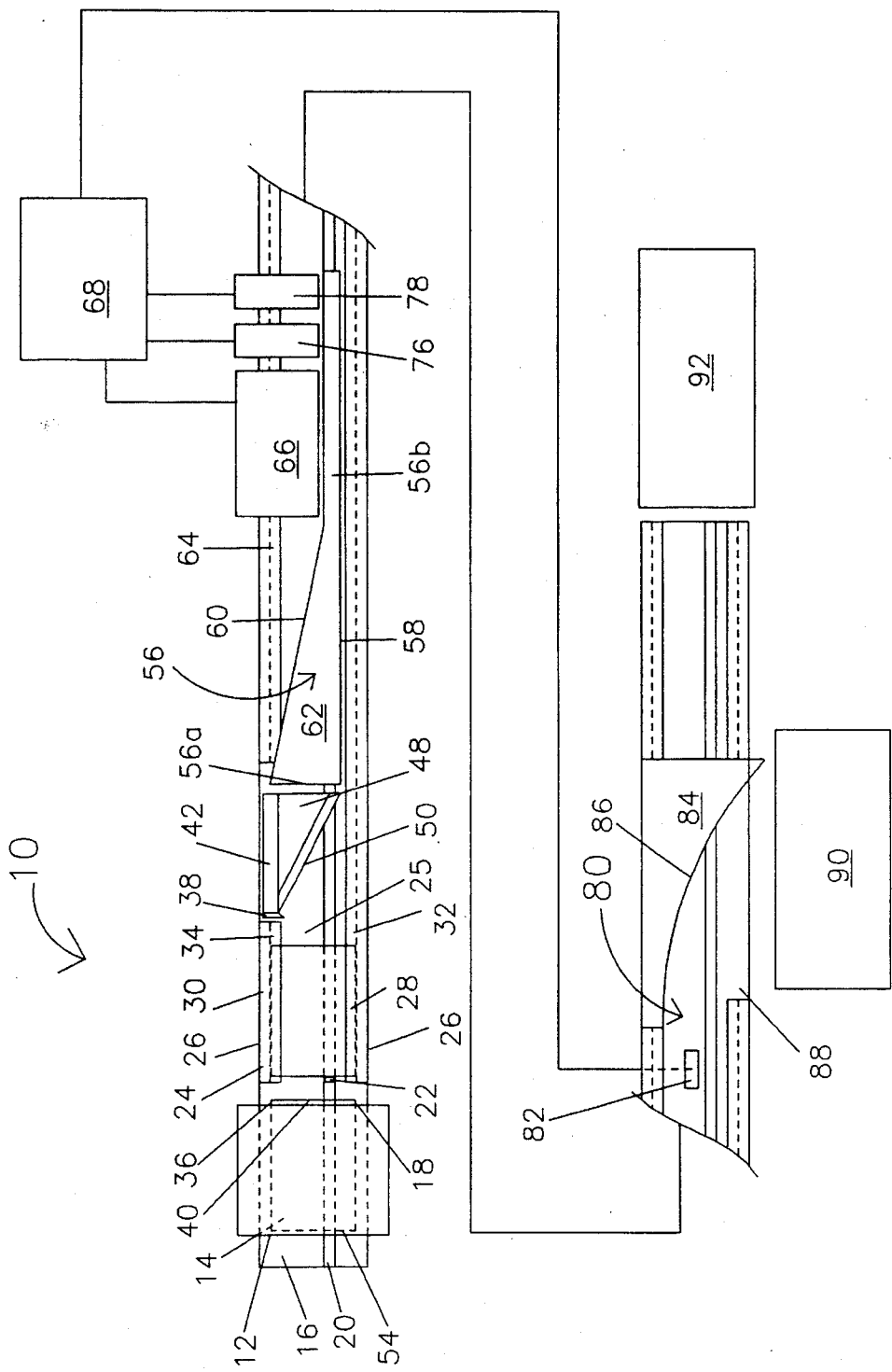
FIG. 1 of the accompanying drawings is a schematic top plan view of a preferred apparatus of the present invention for producing pouches each bearing a unique serial number and bar code, several conventional portions of the apparatus being shown in block diagram form.
Figure 2:
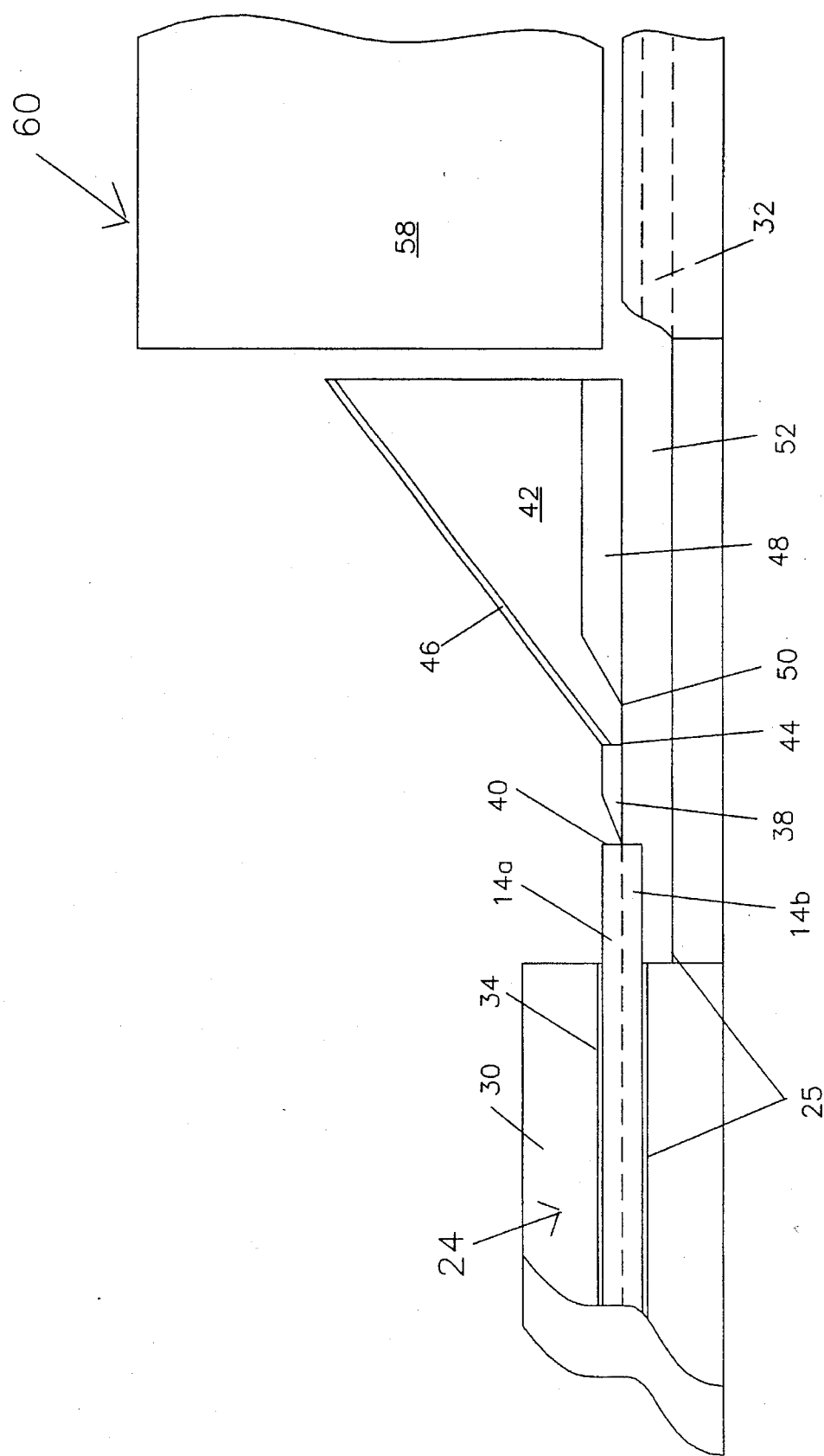
FIG. 2 is an enlarged side elevation of the pouch-opening section of the apparatus shown in FIG. 1, with certain parts broken away for clarity of illustration.

The preferred apparatus (generally designated 10) of the present invention shown in FIGS. 1 and 2 comprises a vacuum destacker 12 of conventional type. This destacker 12 is loaded with a stack of unprinted pouches, which are produced in the conventional manner by superposing first and second sheets of material (typically at least the first of these sheets comprises a transparent plastic film), each of the sheets having one face bearing a coating of heat-activatable adhesive, the two adhesive-bearing surfaces being placed in contact with one another. The first sheet has secured thereto a plurality of holograms. The two sheets are then spot welded together at a plurality of spaced locations and die cut into a plurality of rectangular pouches, the die cutting being arranged so that the portions of the first and second sheets which form the two leaves of the pouch are welded together at one or more points along a secured edge, and so that one hologram is present in the center of the front leaf of each pouch. Although the leaves of the pouch are not secured along their other three edges, the die cutting and the presence of adhesive on the inner surfaces of the leaves causes them to adhere to each other along these three edges.

The destacker 12 includes a vertically reciprocating carriage (not shown) which is raised into contact with the bottom pouch 14 of the stack. The carriage then applies a vacuum to this bottom pouch and is lowered, so pulling the bottom pouch 14 clear of the stack and depositing it upon a horizontal base plate 16. The pouch 14 is deposited upon the base plate 16 with its secured edge 18 pointing downwardly as viewed in FIG. 1.

An impeller means in the form of a chain conveyor 20 bearing a plurality of regularly spaced upstanding detents 22 is installed below the base plate 16 so that one of the detents 22 extends up through a slot provided in the base plate and contacts the left hand edge (as seen in FIG. 1) of the pouch 14, so moving it to the fight in FIG. 1. The operation of the carriage and the conveyor 20 are synchronized so that each pouch 14 is conveyed by each detent 22, and the spacing between adjacent detents is adjusted so that there is only a small gap between the trailing edge of one pouch 14 and the leading edge of the next. (For ease of illustration, FIG. 1 shows only the pouch which is just emerging from the destacker 12, and the immediately preceding pouch, and also omits most of the detents 22 on the conveyor 20. Also for ease of illustration, FIG. 1 is not strictly to scale, and exaggerates the breadth of the apparatus relative to its length.)

The conveyor 20 impels the pouch 14 from the base plate 16 into a channel formed in a channel member 24. As best seen in FIG. 2, this channel member is essentially C-shaped in cross-section, having a horizontal surface 25 on which the pouch 14 rests, two spaced vertical sections 26 extending upwardly along opposed side edges of the channel members and horizontal sections 28 and 30 extending horizontally and inwardly from the upper ends of the vertical sections 26 and defining two channels 32 and 34 adjacent the side edges of the channel member 24. Accordingly, the pouch 14 rests upon the horizontal surface of the channel member 24 with its secured edge 18 confined within the channel 32 and its opposed ("free") edge 36 confined within the channel 34.

The pouch-opening section of the apparatus, which comprises the righthand (in FIG. 1) or outlet end of the channel member 24 and certain adjacent integers, is shown on an enlarged scale in FIG. 2. For convenience, the leaf 14a of the pouch derived from the first sheet of material and destined to form the front layer of the final identification device, may hereinafter be called the "front leaf", while the leaf 14b of the pouch derived from the second sheet of material and destined to form the rear layer of the final identification device, may hereinafter be called the "back leaf". From FIG. 2, it will be seen that the outlet end of the channel 34 has a vertical thickness not substantially greater than the thickness of the pouch 14 (i.e., than the combined thicknesses of the leaves 14a and 14b. In practice, it has been found that if the combined thicknesses of the leaves 14a and 14b is 20 mil (0.5 mm) a channel 34 having a thickness of 21 mil (0.53 mm) gives satisfactory results. (The vertical thickness of both the pouch 14 and the channel 34 is exaggerated in FIG. 2 for ease of illustration.)

A cutter means in the form of a blade 38 is disposed adjacent the outlet end of the channel 34 so as to contact the leading edge 40 of the pouch 14 as this edge emerges from the channel 34. The vertical position of the blade 38 is adjusted so that it contacts the leading edge 40 adjacent the line of adhesion between the front and back leaves 14a and 14b respectively, thereby separating these leaves (or at least the portions thereof adjacent the blade 38, as discussed in more detail below) and causing the front leaf 14a to pass above the blade 38 while the rear leaf 14b passes below the blade. Desirably, the blade 38 is equipped to a vertical adjustment device (not shown) to enable the vertical position of the blade to be adjusted for optimum results with front leaves 14a varying in thickness.

For optimum results, it has been found that both the spacing between the outlet end of the channel 34 and the blade 38, and the horizontal distance which the blade 38 protrudes across the channel 34, should be carefully controlled. As shown in FIG. 2, the blade 38 causes the front leaf 14a to curl upwardly and the back leaf 14b to curl downwardly. If the blade 38 is too close to the end of the channel 34, depending upon the physical properties of the leaves, the pouch may tend to jam in the gap between the blade 38 and the end of the channel 34. On the other hand, if the gap between the outlet end of the channel 34 and the blade 38 is too great, stresses within the pouch 14, such as are sometimes left after die cutting, may cause the pouch to curl vertically before it contacts the blade 38, and if this curling becomes substantial, the blade 38 may contact the leading edge 40 of the pouch 14 at a point removed from the line of adhesion of the front and back leaves 14a and 14b respectively. This may cause damage to one of the leaves, and in extreme cases both leaves may pass on the same side of the blade 38 and thus fail to be separated. Although the optimum spacing between the outlet end of the channel 34 and the blade 38 may vary with the physical properties of the pouch 14 and other factors, in general it has been found that this spacing is desirably from about 2 to about 12 times, preferably from about 3 to about 9 times, the thickness of the channel 34. Thus, for a 20 mil thick pouch and a 21 mil thick channel, the spacing between the outlet end of the channel and the blade 38 is desirably in the range of about 60 to about 180 mil (1.5 to 4.6 mm).

It is also desirable that the blade 38 not protrude too far across the channel 34, and thus contact too long a portion of the leading edge 40 of the pouch. Because of the flexibility of the pouch 14, the maximum force which can be exerted on the pouch by the blade 38 before undesirable bending of the pouch occurs is limited, and in practice better results are obtained if the blade 38 only contacts a small portion of the leading edge 40 adjacent the corner at which the edge 40 joins the free edge 36 of the pouch 14. By limiting the distance of contact between the blade 38 and the leading edge 40, the force applied by the blade per unit length of the leading edge is increased and a cleaner and more reliable separation of the leaves of the pouch is obtained. A distance of contact of about 2–3 mm. gives good results. The distance of contact should not be reduced too far, or a slight distortion or horizontal variation in width of the pouch may cause the pouch to miss the blade 38 completely. Once the leaves of the pouch have been separated along 2 mm or so of the leading edge 40, complete separation of the leading edge is effected by an auxiliary cutter means, as described below.

The pouch-opening section of the apparatus 10 further comprises a wedge means in the form of an essentially triangular prismatic wedge 42 disposed adjacent the blade 38 on the opposed side of the blade from the outlet end of the channel 34 (i.e., immediately "downstream" of the blade 38 in the direction of travel of the pouch 14). The wedge 42 has a narrow end 44 fixed to the blade 38 (conveniently, the blade 38 is mounted on the wedge 42 so that the vertical positions of the blade and the wedge can be adjusted simultaneously by a single adjusting device) and its vertical dimension increases away from the wedge 42. On its upper surface, the wedge 42 bears a replaceable cover 46, which is made of rubber or another soft, non-abrasive material; this cover 46 serves to allow the front leaf 14a of the pouch to slide up over the wedge 42 without damage to the leaf 14a.

An auxiliary cutter means in the form of a flat, right triangular cutting plate 48 is secured to the side of the wedge 42 so as to extend across the width of the channel 34. The cutting plate has a tip facing the channel 34 and its hypotenuse extends at an acute angle to the direction of travel of the pouch 14. Along this hypotenuse, the cutting plate 48 is bevelled to create a sharp cutting edge 50. As shown in FIG. 2, the lower surfaces of both the wedge 42 and the cutting plate 48 are horizontal and extend parallel to the horizontal surface 25 which continues, at a slightly lower level, from the channel member 24 beneath the wedge 42 and the cutting plate 48. Thus, a narrow horizontal channel 52 is provided below the wedge 42 and the cutting plate 48, and this channel 52 serves to guide the back leaf 14b of the pouch 14.

The wedge 42 and the cutting plate 48 serve to complete the separation of the from and back leaves 14a and 14b respectively begun by the blade 38. As already noted, the front leaf 14a passes above the blade 38 while the back leaf 14b passes below the blade. Since the wedge 42 is fixed to the blade 38, the front leaf 14a passes above the wedge 42, with the free edge 40 of the front leaf sliding up the cover 46. The increasing vertical thickness of the wedge 42 increases the separation between the leaves 14a and 14b, thus tending to increase the portion of the leading edge 40 of the pouch 14 along which the leaves are separated. At the same time, the cutting edge 50 on the cutting plate 48 enters the gap which the blade 38 has opened between the leaves 14a and 14b at one end of the leading edge 40, and as the pouch 14 is impelled past the cutting plate 48, the cutting edge 50 completes the separation of the leaves 14a and 14b along the full length of the leading edge 40 of the pouch 14. The cutting edge 50 and the wedge 42 also effect separation of the leaves 14a and 14b along the free edge 36 and the trailing edge 54 of the pouch 14. Thus, when the pouch 14 has completely passed the cutting plate 48, the leaves 14a and 14b are attached to each other only along the secured edge 18. The back leaf 14b passes beneath the wedge 42 and the cutting plate 48 into the channel 52. It should be noted that (although mostly omitted from FIG. 2 for the sake of clarity) the channel 32 holding the secured edge 18 continues beyond the end of the channel 34 and past the blade 38, wedge 42 and cutting plate 48, and thus the secured edge 18 remains within the channel 32 during the period while the leaves are being separated from one another along the other three edges of the pouch 14.

On the opposed side of the wedge 42 from the blade 38 (i.e., immediately downstream of the wedge 42) is disposed a first guide means in the form of a guide member 56 (see FIG. 1). In vertical section, this guide member is essentially U-shaped, having vertical limbs 58 and 60 connected at their upper ends by a horizontal limb 62; the guide member 56 is open to below. The horizontal limb 62 tapers in the downstream direction (to the right in FIG. 1) so that the guide member 56 has a wide mouth 56a facing the wedge 42 and, at its opposed end, a narrow section 56b in which the vertical limbs 58 and 60 are close together, leaving only a narrow vertical channel therebetween.

The horizontal surface 25 and the channel 32 holding the secured edge 18 of the pouch 14 continue below vertical limb 58 of the guide member 56 for the full length thereof. Also, beneath the vertical limb 60 of the guide 56, there is provided a channel 64 extending parallel to the channel 32; this channel 64, which is aligned with, and is in effect a continuation of, the channel 34 in the channel member 26, acts as a second guide means to guide the free edge of the back leaf 14b.

The front leaf 14a, as it passes over the downstream end of the wedge 42, enters the mouth 56a of the guide 56 and slides down the inside wall of the vertical limb 60. Accordingly, by the time the pouch 14 reaches the narrow section 56b, the front leaf 14a is held substantially vertically between the closely spaced vertical limbs 58 and 60. Meanwhile, the secured edge 18 of the pouch 14 is still confined within the channel 32, while the free edge 36 of the back leaf 14b has been guided by the channel 52 into the channel 64. Thus, the back leaf 14b is held horizontally, essentially normal to the front leaf 14a, and adjacent the horizontal surface 25.

Figure 3:
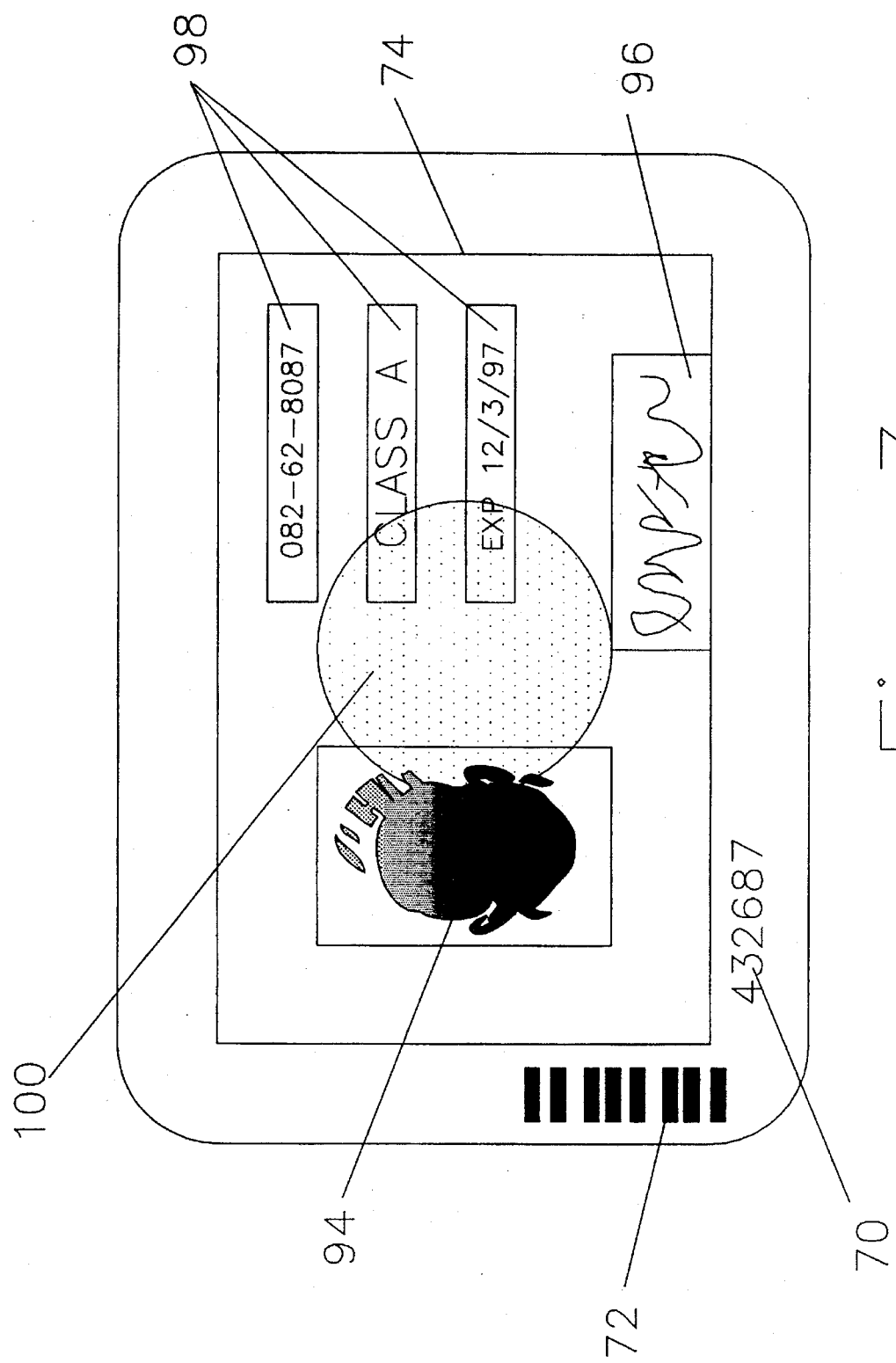
FIG. 3 is a front view of an identification device produced from a pouch produced by the apparatus of FIG. 1.

A printing means in the form of a thermal printer 66 is disposed adjacent the narrow section 56b of the guide member 56 and prints upon the upper surface of the back leaf 14b (i.e., upon what will become the front surface of the back leaf of the final identification device); because the front leaf 14a is at this point held essentially vertically by the guide member 56, the entire upper surface of the back leaf 14b is readily accessible to the printer 66, and the horizontal surface 25 provides a firm "backstop" against which the back leaf 14b rests during printing. The printer 66 operates under the control of a control unit 68, which can be a microprocessor-controlled device of conventional type. As shown in FIG. 3, the printer 66, under control of the control unit 68, prints upon the back leaf 14b a visually-readable serial number 70 and a machine-readable bar code 72, the serial number 70 being placed adjacent the free edge 36 of the leaf 14b and the bar code 72 being placed adjacent the leading edge 40 thereof; the control unit 68 ensures-that a unique serial number and bar code are placed on each pouch 14 passing the printer 66. Placing the serial number and bar code adjacent the edges of the leaf 14b in this manner ensures that the serial number and bar code are still legible after an insert 74 (FIG. 3) has been sealed between the leaves 14a and 14b to form the final identification device.

For enhanced security, it is desirable that the bar code not be a simple transcription of the serial number but derivable from the serial number by some coding scheme. For example, the bar code could be a truncated version of the serial number, the digits of the serial number could be scrambled in the bar code, the bar code could be an octal (or other non-decimal) version of the serial number, or the digits of the bar code could be derived by adding a random, but predetermined, series of numbers to the digits of the serial number.

After passing the printer 66, the pouch 14, with its front leaf 14a still held vertically within the narrow section 56b, passes beneath an inspection means comprising an optical character reader 76, which is arranged to inspect the serial number 70, and a bar code reader 78, which is arranged to inspect the bar code 72. Both the optical character reader 76 and the bar code reader 78 are linked electronically to the control unit 68, and if either reader 76 or 78 fails to supply to the control unit the expected value for the serial number 70 or the bar code 72, a rejection signal is generated within the control unit 68, and is passed to a rejection means (generally designated 80).

This rejection means 80, which is disposed adjacent the downstream end of the narrow section 56b of the guide member 56, comprises a vertically moveable ramp member 82 controlled by the control unit 68, and a diverter plate 84, which is secured to and disposed above the member defining the aforementioned channels 32 and 64. This diverter plate 84 has an arcuate edge 86, the upstream end of which lies immediately above the channel 64, but which curves to that it crosses the line of the channel 32 and terminates on the opposed side of the channel 32 from the channel 64. The channel 32 is interrupted at 88 just upstream of the point where the arcuate edge 86 crosses the line of the channel 32. Although not shown in FIG. 1, the arcuate edge 86 has a horizontal channel cut therein, so that the upstream end of this channel lies vertically above the channel 64. A rejection receptacle or bin 90 is provided adjacent the downstream end of the arcuate edge 86. The channel 64 continues unbroken past the diverter plate 84, and the channel 32 resumes downstream from 88, both channels terminating downstream from the diverter plate 84 adjacent a collection receptacle or bin 92.

The rejection means 80 is provided to enable improperly printed pouches to be rejected and substitute pouches printed by the printer 66. For maximum security, it is important that the operator of a security system be provided with pouches bearing a series of consecutive serial numbers, since the consecutive serial numbers render any diversion of pouches during transit immediately apparent, enabling the relevant serial numbers to be voided and their use in forged identification documents prevented. A Motor Vehicle Registry, for example, may need a million consecutively numbered pouches, and it is effectively impossible to produce a million consecutively numbered pouches without some rejects. The rejection means 80 and the control unit 68 cooperate to reject improperly printed pouches and to print substitute pouches beating the stone serial numbers as the rejected ones, thus enabling long series of consecutively numbered pouches to be produced without any missing numbers. Since production of the pouches will normally take place at one central location, it is simple to ensure that the improperly printed pouches are destroyed under supervision and do not fall into the hands of counterfeiters.

When the optical character reader 76 and the bar code reader 78 produce their expected readings, no rejection signal is generated by the control unit 68, the ramp member 82 stays flush with the horizontal surface 25 and the printed pouch is guided by the channels 32 and 64 into the collection bin 92, in which the pouches accumulate in serial number order. However, when either the optical character reader 76 or the bar code reader 78 fail to produce their expected readings, a rejection signal is generated by the control unit 68, the ramp member 82 is raised and the flee edge 36 of the back leaf 14b is forced out of the channel 64 and into the channel in the arcuate edge 86. Consequently, instead of passing straight through to the collection bin 92, the free edge 36 of the back leaf 14b is guided by the channel in the arcuate edge 86 along this edge, and the defective pouch is diverted into the rejection bin 90, the contents of which are periodically removed and destroyed under secure conditions. In practice, it is necessary to divert into the rejection bin 90 not only the defective pouch but also the succeeding pouch, which has already been printed by the printer 66. The control unit then resets the printer 66 so that the second pouch after the pouch which triggered the rejection is printed with the same serial number and bar code as the pouch which triggered the rejection, and thereafter the serial numbers and bar codes follow the regular sequence.

The finished identification device shown in FIG. 3 is prepared from the pouches prepared by the apparatus shown in FIGS. 1 and 2 in the conventional manner by preparing the insert 74 displaying thereon a photograph 94 of the bearer of the device, the bearer's signature 96 and other identifying indicia 98. This insert 74 is then heat laminated between the front and back leaves 14a and 14b respectively of a pouch 14. As shown in FIG. 3, the photograph 94, signature 96 and indicia 98 are visible through the transparent front leaf 14a and the transparent hologram 100 carried thereby, and the insert 74 is sized so that the serial number 70 and the bar code 72 are also visible through the transparent front leaf 14a, and can readily be inspected by security personnel. Conveniently, the back leaf 14b is opaque or translucent to provide a background against which the serial number 70 and the bar code 72 can be viewed; however, if desired the back leaf 14b can be transparent.

It will be apparent to those skilled in the art of identification devices that numerous changes and modifications can be made in the preferred process and apparatus described above, without departing from the scope of the present invention. For example, the printer 66 need not be a printer in the restricted sense of a device for placing an ink upon a substrate, but may be any device capable of producing a permanent imprint upon a leaf of the pouch. For example, the printer 66 could be replaced by a thermal embossing head which embosses a serial number and bar code on the pouch. Also, the apparatus could be modified so that printing is effected on the rear face of the front leaf 14a instead of the front face of the back leaf 14b. Printing on the rear face of the front leaf has the advantage that the positioning of the serial number and bar code is not restricted to the peripheral areas of the pouch lying beyond the insert 74, since the printing can be viewed against the insert 74. However, printing on the front leaf 14a in this manner does require that the printing be left-right reversed so as to read correctly when read through the front leaf, and such left-right reversed printing may be difficult to achieve with some conventional printers.

Instead of being read through the front leaf of the pouch, the bar code (and/or the serial number, if desired) may be designed to be read through a transparent or translucent back leaf. This may require left-right reversed printing on the back leaf, but has the advantage that the position of the bar code is not restricted by the size of the insert in the identification document.

For additional security, the bar code may be printed in ink which only absorbs at non-visible wavelengths (e.g., infrared or ultraviolet wavelengths) or an additional identifying indicium may be provided which only absorbs at non-visible wavelengths. Thus, the authenticity of any purported identification device may be checked by exposing it at non-visible wavelengths, since a forger may fail to forge the humanly-invisible bar code or other identifying indicium. To still further enhance security, the invisible bar code or other identifying indicium may be covered by a visibly colored bar (formed from an ink which is substantially transparent at the wavelength used to read the invisible bar code or other identifying indicium) or even by a fake visible bar code or other identifying indicium.

Also, any known rejection device may be used to reject unsatisfactory pouches. For example, unsatisfactory pouches could be rejected by a ram which physically pushes them off the horizontal surface 25, or a pneumatic device which removes the pouch from this surface by means of an air blast.

From the foregoing, it will be seen that the apparatus and process of the present invention provide a method for separating pouches, or similar devices comprising a pair of laminae adhering to one another, this method being readily capable of automation to handle pouches in the quantities required for commercial identification systems.

I claim:

1. Apparatus for separating a first flexible lamina of predetermined thickness from a second lamina to which the first lamina is secured along a secured edge, the first and second laminae also being adhered to each other along an adhered edge different from the secured edge, the apparatus comprising:

a channel member having walls defining a channel having a thickness not substantially greater than the combined thickness of the first and second laminae, the channel having an outlet opening at one end;

impeller means for impelling the first and second laminae together through the channel and out of the outlet opening in a direction substantially parallel to the secured edge;

cutter means disposed adjacent the outlet opening such that, as the laminae are impelled through the outlet opening, the cutter means contacts the adhered edge adjacent the line of adhesion between the laminae, thereby separating the laminae;

wedge means disposed adjacent the cutter means on the opposed side thereof from the outlet opening, the cross-section of the wedge means increasing with distance from the cutter means, the wedge means being arranged so that as the first and second laminae are separated by the cutter means and are impelled past the wedge means, the two laminae pass on opposed sides of the wedge means, thereby increasing the separation between the laminae;

first and second guide means disposed on the opposed side of the wedge means from the cutter means, the first guide means being arranged to receive an edge of the first lamina remote from the secured edge thereof, and the second guide means being arranged to receive an edge of the second lamina remote from the secured edge thereof, such that the first and second guide means hold the first and second laminae apart at an angle of at least about 30° to each other; and printing means for printing on at least one of the faces of the first and second laminae which were in contact before separation of the laminae, the printing means being arranged to effect said printing while the first and second laminae are held apart by the first and second guide means.

2. Apparatus according to claim 1 wherein the impeller means comprises a movable detent arranged to engage the edge of the adhered laminae opposite the adhered edge thereof.

3. Apparatus according to claim 1 wherein the cutter means is arranged to contact and separate the laminae along only a portion of said edge adjacent its junction with another edge of said laminae, the apparatus further comprising an auxiliary cutter means disposed adjacent the wedge means, the auxiliary cutter means having a cutting edge extending substantially in the plane of the laminae and at an acute angle to the direction of travel of the laminae, so that as the laminae are impelled past the auxiliary cutter means, the laminae are separated along a progressively larger portion of said edge.

4. Apparatus according to claim 1 wherein the separation between the outlet opening and the part of the cutter means which first contacts the laminae is from about 2 to about 12 times the thickness of the channel.

5. Apparatus according to claim 1 wherein the printing means is arranged to print a different identifying indicium on each successive pair of laminae passing the printing means.

6. Apparatus according to claim 1 further comprising inspection means disposed on the opposed side of the printing means from the cutter means and arranged to inspect the printing effected by the printing means and to generate a rejection signal if the printing is unsatisfactory, and rejection means arranged to receive the rejection signal and to divert laminae bearing unsatisfactory printing into a rejection receptacle, while permitting laminae bearing satisfactory printing to pass into a collection receptacle.

7. A process for separating a first, flexible lamina of predetermined thickness from a second lamina to which the first lamina is secured along a secured edge, the first and second laminae also being adhered to each other along an adhered edge different from the secured edge, the process comprising:

providing a channel member having walls defining a channel having a thickness not substantially greater than the combined thickness of the first and second laminae, the channel having an outlet opening at one end;

providing cutter means adjacent the outlet opening; and providing wedge means disposed adjacent the cutter means on the opposed side thereof from the outlet opening, the cross-section of the wedge means increasing with distance from the cutter means;

providing first and second guide means disposed on the opposed side of the wedge means from the cutter means; and impelling the adhered first and second laminae together in a direction substantially parallel to the secured edge through the channel, through the outlet opening, past the cutter means and over the wedge means, the cutter means contacting the adhered edge adjacent the line of adhesion between the laminae, thereby separating the laminae and causing the separated laminae to pass on opposed sides of the wedge means, thereby causing the separation between the laminae to increase as they pass the wedge means, and, after the laminae have passed the wedge means, causing the edge of the first lamina remote from the secured edge thereof to contact the first guide means, while the edge of the second lamina remote from the secured edge thereof contacts the second guide means so that the first and second guide means hold the first and second laminae at an angle of at least about 30° to each other; and while the first and second laminae are in contact with the first and second guide means respectively, printing on at least one of the faces of the first and second laminae which were in contact before separation of the laminae.

8. A process according to claim 7 wherein the first and second laminae are impelled by a movable detent engaging the edge of the adhered laminae opposite the adhered edge thereof.

9. A process according to claim 7 wherein the cutter means contacts and separates the laminae along only a portion of said edge adjacent its junction with another edge of said laminae, and after passing the cutter means the laminae contact an auxiliary cutter means disposed adjacent the wedge means, the auxiliary cutter means having a cutting edge extending substantially in the plane of the laminae and at an acute angle to the direction of travel of the laminae, so that as the laminae pass the auxiliary cutter means, they are separated along a progressively larger portion of said edge.

10. A process according to claim 7 wherein the distance which the adhered laminae travel between the outlet opening and their first contact with the cutter means is from about 2 to about 12 times the thickness of the channel.

11. A process according to claim 7 wherein a plurality of pair of laminae are successively impelled past the cutter means and the wedge means, and wherein a different identifying indicium is printed on each successive pair of laminae.

12. A process according to claim 7 wherein there is printed on each pair of laminae at least one visually-readable indicium and at least one machine-readable indicium.

13. A process according to claim 7 wherein, after the printing, the pair of laminae pass an inspection means arranged to inspect the printing on the laminae and to generate a rejection signal if the printing is unsatisfactory, and thereafter the pair of laminae pass a rejection means arranged to receive the rejection signal from the inspection means and to divert laminae bearing unsatisfactory printing into a rejection receptacle, while permitting laminae bearing satisfactory printing to pass into a collection receptacle.

14. Apparatus for separating a first flexible lamina of predetermined thickness from a second lamina to which the first lamina is secured along a secured edge, the first and second laminae also being adhered to each other along an adhered edge different from the secured edge, the apparatus comprising:

a channel member having walls defining a channel having a thickness not substantially greater than the combined thickness of the first and second laminae, the channel having an outlet opening at one end;

impeller means for impelling the first and second laminae together through the channel and out of the outlet opening in a direction substantially parallel to the secured edge;

cutter means disposed adjacent the outlet opening such that, as the laminae are impelled through the outlet opening, the cutter means contacts the adhered edge adjacent the line of adhesion between the laminae, thereby separating the laminae;

wedge means disposed adjacent the cutter means on the opposed side thereof from the outlet opening, the cross-section of the wedge means increasing with distance from the cutter means, the wedge means being arranged so that as the first and second laminae are separated by the cutter means and are impelled past the wedge means, the two laminae pass on opposed sides of the wedge means, thereby increasing the separation between the laminae;

first and second guide means disposed on the opposed side of the wedge means from the cutter means, the first guide means being arranged to receive an edge of the first lamina remote from the secured edge thereof, and the second guide means being arranged to receive an edge of the second lamina remote from the secured edge thereof, such that the first and second guide means hold the first and second laminae apart at an angle of at least about 30° to each other.

15. A process for separating a first, flexible lamina of predetermined thickness from a second lamina to which the first lamina is secured along a secured edge, the first and second laminae also being adhered to each other along an adhered edge different from the secured edge, the process comprising:

providing a channel member having walls defining a channel having a thickness not substantially greater than the combined thickness of the first and second laminae, the channel having an outlet opening at one end;

providing cutter means adjacent the outlet opening; and providing wedge means disposed adjacent the cutter means on the opposed side thereof from the outlet opening, the cross-section of the wedge means increasing with distance from the cutter means;

providing first and second guide means disposed on the opposed side of the wedge means from the cutter means; and impelling the adhered first and second laminae together in a direction substantially parallel to the secured edge through the channel, through the outlet opening, past the cutter means and over the wedge means, the cutter means contacting the adhered edge adjacent the line of adhesion between the laminae, thereby separating the laminae and causing the separated laminae to pass on opposed sides of the wedge means, thereby causing the separation between the laminae to increase as they pass the wedge means, and, after the laminae have passed the wedge means, causing the edge of the first lamina remote from the secured edge thereof to contact the first guide means, while the edge of the second lamina remote from the secured edge thereof contacts the second guide means so that the first and second guide means hold the first and second laminae at an angle of at least about 30° to each other.

* * * * *